United States Patent
Zhang et al.

(10) Patent No.: US 7,769,151 B2
(45) Date of Patent: Aug. 3, 2010

(54) SYSTEM AND METHOD FOR IMPLEMENTING PREPAID DATA SERVICES

(75) Inventors: Jie Zhang, Guangdong (CN); Yimin Li, Guangdong (CN); Junrong Xu, Guangdong (CN); Xuanming Lu, Guangdong (CN); Xiaodong Zhao, Guangdong (CN)

(73) Assignee: Huawei Technologies Co., Ltd., Shenzhen, Guangdon (CN)

( * ) Notice: Subject to any disclaimer, the term of this patent is extended or adjusted under 35 U.S.C. 154(b) by 826 days.

(21) Appl. No.: 10/562,867

(22) PCT Filed: Jul. 1, 2004

(86) PCT No.: PCT/CN2004/000714

§ 371 (c)(1),
(2), (4) Date: Oct. 3, 2006

(87) PCT Pub. No.: WO2005/004389

PCT Pub. Date: Jan. 13, 2005

(65) Prior Publication Data

US 2007/0217581 A1 Sep. 20, 2007

(30) Foreign Application Priority Data

Jul. 1, 2003 (CN) .............................. 03 1 45175
Sep. 28, 2003 (CN) .............................. 03 1 26472

(51) Int. Cl.
*H04M 15/00* (2006.01)
*H04M 11/00* (2006.01)
(52) U.S. Cl. .............................. 379/114.2; 379/114.15; 455/406
(58) Field of Classification Search ......... 455/405–408; 379/114.15–114.17, 114.2, 114.01, 114.03, 379/114.28, 221.09, 221.11
See application file for complete search history.

(56) References Cited

U.S. PATENT DOCUMENTS 6,438,220 B1 8/2002 Liu (Continued)

FOREIGN PATENT DOCUMENTS

EP 1 065 838 A2 1/2001

(Continued)

OTHER PUBLICATIONS

Lior Bridgewater Systems P Yegani Cisco K Chowdhudy Nortel L Madour Ericsson Canada Y Li Bridgewater Systems A: "PrePaid Extensions to Remote Authentication Dial-In User Service (RADIUS)" IETF Standard-Working-Draft, Internet Engineering Task Force, IETF, CH, No. 3, Feb. 16, 2003, XP015031733 ISSN:0000-0004.

(Continued)

*Primary Examiner*—Quoc D Tran

(57) ABSTRACT

The present invention discloses a system and method for implementing prepaid data services in a mobile communication network. In this system, a Data service Access Control Point (DACP), which is used for fulfilling price confirmation function and fee application function for data services, is added between a Service Control Point (SCP) storing prepaid account information of subscribers and a Prepaid Server/Content of Process Gateway (PPS/CP GW) used for data service charging. In the method of the present invention, by means of the interaction among a Packet Data Service Note (PDSN), a Home Authentication Authorization and Accounting (HAAA) server, the PPS/CP GW, the DACP and the SCP, the SCP deducts the fees from the prepaid account, and the PDSN controls the subscriber to utilize data service according to the fees deducted by the SCP. With the present invention, the subscriber can make prepayment for a data service by a prepaid voice account, which facilitates data service extension of mobile network operators and provides convenient data services for the subscribers.

10 Claims, 5 Drawing Sheets

U.S. PATENT DOCUMENTS

| | | | |
|---|---|---|---|
| 7,239,862 B1 * | 7/2007 | Clare et al. | 455/406 |
| 2002/0102962 A1 * | 8/2002 | Grinn et al. | 455/406 |
| 2004/0106393 A1 * | 6/2004 | Chowdhury et al. | 455/406 |

FOREIGN PATENT DOCUMENTS

| | | |
|---|---|---|
| EP | 1 223 737 A | 7/2002 |
| EP | 1261192 A1 | 11/2002 |
| WO | WO 0010350 A1 | 2/2000 |

OTHER PUBLICATIONS

"IMT-2000 references to ANSI-41 evolved core network with cdma2000 access network" ITU-T Standard in Force (I), International Telecommunication Union, Geneva, CH, No. Q17421 12/2, Dec. 14, 2002, XP017402618.

* cited by examiner

SYSTEM AND METHOD FOR IMPLEMENTING PREPAID DATA SERVICES

CROSS-REFERENCE TO RELATED APPLICATIONS

This application claims priority to Patent Cooperation Treaty (PCT) Application No. PCT/CN2004/000714 filed Jul. 1, 2004, entitled, SYSTEM AND METHOD FOR IMPLEMENTING DATA SERVICE PREPAYMENT, which claims priority to Chinese Patent Application Serial Nos. 03145175.6 filed Jul. 1, 2003 and 03126472.7 filed Sep. 28, 2003, all of the disclosure of which is hereby incorporated by reference in its entirety.

FIELD OF THE TECHNOLOGY

The present invention relates to service payment in a mobile communication system, more particularly, to a system and method for implementing prepaid data services in a mobile communication network.

BACKGROUND OF THE INVENTION

In a mobile communication network such as a Code Division Multiple Access (CDMA) system, besides traditional voice services, data services are rapidly developing and are playing increasingly important roles. In conventional mobile communication systems, voice services and data services are transferred separately by means of different devices. Signaling for voice services is transmitted by means of a No. 7 signaling network, while signaling for data services is transmitted through an Internet Protocol (IP) network. Since the No. 7 signaling network and the IP network are independent from each other, payment for voice services and that for data service are made independently as well.

FIG. 1 shows the basic structure of a conventional CDMA system. As shown in FIG. 1, a Mobile Station (MS) is connected to a Radio Network (RN) which comprises a Base Station Controller (BSC), a Base Transceiver Station (BTS) and a Packet Control Function (PCF) module. The BSC/BTS is connected to a Mobile Switching Center (MSC) which is used to control voice services for subscribers. The MSC is connected to a Home Location Register (HLR) and a Service Control Point (SCP) of an intelligent network by means of a No. 7 signaling network, and interacts with the SCP through a Wireless Intelligent Network (WIN) protocol, so as to implement authentication and accounting of prepaid subscribers.

As for data services, the MS is connected to a Packet Data Service Node (PDSN) through the PCF module in the RN. The PDSN is an access gateway by which the MS can access Internet by means of IP. Specifically speaking, the PDSN is responsible for managing subscriber's status, forwarding subscriber data and allocating IP addresses for MS. The PDSN is connected to a Home Authentication Authorization and Accounting (HAAA) server which is used to perform authentication, authorization and accounting of the subscriber's account. At present, in order to implement prepayment for data services by a subscriber, a Prepaid Server (PPS)/Content Provider Gateway (CP GW) is configured in the system, responsible for service triggering for subscribers of prepaid data services, wherein PPS and CP GW handle data flows and data contents, respectively.

In conventional CDMA networks, since prepaid voice services and prepaid data services are implemented by two relatively independent networks, respectively, a subscriber's account for prepaid voice services cannot be used to pay for the data services, namely, the PPS/CP GW is not able to obtain the account information of subscribers' prepaid voice service. As a result, communication network operators cannot develop prepaid data services by utilizing the facilities of prepaid voice services of a CDMA network, thus development of data services is constrained. Moreover, a subscriber has to open two accounts to enjoy both voice services and data services, bringing great inconvenience to the subscriber.

SUMMARY OF THE INVENTION

In view of the above, a main object of the present invention is to provide a system for implementing prepaid data services so that data services can be prepaid with a prepaid account for voice services, thereby facilitating data service extension of mobile network operators as well as providing convenient data services for the subscribers.

Another object of the present invention is to provide a method for implementing prepaid data services with the above-mentioned system.

A system according to the present invention comprises a Radio Network (RN), a Packet Data Service Node (PDSN), a Home Authentication Authorization and Accounting (HAAA) server, a Prepaid Server (PPS)/Content Provider Gateway (CP GW), a Mobile Switching Center (MSC) and a Service Control Point (SCP), the RN further comprising a Base Station Controller (BSC)/Base Transceiver Station (BTS) and a Packet Control Function (PCF) module for data services, the BSC/BTS being connected to both the MSC and the PCF module, the MSC being connected to the SCP by means of a No. 7 signaling network, the PCF module being connected to the PDSN, the PDSN being connected to the HAAA via an IP network and the HAAA being connected to the PPS/CP GW. This system further comprises a Data service Access Control Point (DACP) for fulfilling price confirmation function and fee application function for data services, the DACP being connected to both the PPS/CP GW and the SCP.

The DACP comprises a communication module used for communicating with the SCP so as to implement fee application function; a service analyzing and processing module, a database/file management module and a database server module which are connected in sequence and used for implementing price confirmation function for data services together; and a core module used for controlling the above-mentioned modules to cooperate with one another, the communication module, the service analyzing and processing module and the database/file management module being connected to the core module respectively. Furthermore, the DACP may further comprise a monitoring module used for monitoring the operations of the communication module, the core module and the service analyzing and processing module; a timing module used for sending timing messages so as to trigger the DACP to implement corresponding functions; and a user interface module for providing an interface for cooperating and maintaining the DACP system, both the timing module and the user interface module being connected to the communication module.

The Transmission Control Protocol/Internet Protocol (TCP/IP) may be adopted for communications between the DACP and the SCP as well as those between the DACP and the PPS/CP GW.

A method for implementing prepaid data services in a mobile communication network according to the present invention comprises:

a. disposing a DACP for fulfilling price confirmation function and fee application function for data services between the PPS/CP GW and the SCP; and b. after the PDSN receives a request message for data service utilization by a prepaid service subscriber, by means of interaction among the HAAA, the PPS/CP GW, the DACP and the SCP, the SCP deducting fees from the account of the prepaid service subscriber, and the PDSN controlling data service utilization of the subscriber according to the fees deducted by the SCP.

The interaction may comprise:

b1. after receiving a charging request message from the PDSN, the HAAA sending a charging request message for requesting fee distribution to the DACP via forwarding of the PPS/CP GW, the DACP sending a fee request message to the SCP; and b2. after receiving a fee request response message containing information about the distributed fee from the SCP, the DACP converting the information about the distributed fees by the SCP into information for PDSN to control data service utilization of the subscriber, and then sending a charging request response message, which contains the information for PDSN to control data service utilization of the subscriber, to the PDSN via the PPS/CP GW and the HAAA.

The method may further comprise the following steps between steps b1 and b2:

the SCP judging whether the requested fees can be distributed from a prepaid account of the subscriber, if so, executing step b2; otherwise, returning a response message indicating failure in fee distribution to the DACP, the DACP returning a response message indicating failure in fee distribution to the PDSN via the PPS/CP GW and the HAAA, the PDSN refusing data service utilization of the subscriber or terminating the data service currently used by the subscriber, and then ending the current procedure.

In the method, the information for PDSN to control data service utilization of the subscriber is time period information or flow quantity information, the charging request message in step b1 further comprising charging manner information which indicates either time period or flow quantity will be used to control the subscriber to utilize data services, the DACP converting the unused fees into time period or flow quantity according to the charging manner information, and the charging request response message further comprising the charging manner information.

The method may further comprise:

after receiving information indicating the subscriber has terminated data service utilization, the PDSN sending a charging request information containing information indicating the subscriber's termination and the used time period/flow quantity information to the HAAA, the HAAA sending a charging request message containing used time period/flow quantity information to the DACP via the PPS/CP GW, the DACP converting the used time period/flow quantity into fee information and then sending a fee return message containing the fee information to the SCP; and the SCP returning the fees to the prepaid account of the subscriber, sending a fee return response message indicating successful fee return to the DACP, and then the DACP returning a charging request response message indicating successful fee return to the PDSN via the PPS/CP GW and the HAAA.

When the required fees of the data service utilization by the subscriber are close to the distributed fees, the PDSN may send a charging request message to the HAAA again so as to request fees for the next data service utilization.

The charging request message, the charging request response message, the fee request message and the fee request response message contain at least an information identifier, a mobile terminal number, an IP address of the PPS/CP GW server and a serial number of the PPS/CP GW server.

It can be seen from the technical schemes of the present invention, by adding a DACP between the SCP in a voice transmission network and the PPS/CP GW in a data transmission network and then uniformly conducting the access and control of data services for prepaid subscribers, the PPS/CP GW of the data transmission network can implement charging and control for data services by means of the DACP, and the subscriber is able to make prepayment for data services with her/his prepaid voice account by the DACP interacting with the subscriber's account in the SCP. Therefore, communication network operators can provide data services for current voice service subscribers, and the subscribers can utilize data services by using existing prepaid voice accounts. Accordingly, the present invention has brought convenience to the operators and subscribers of communication networks and has shown a prospect of broad applications.

In addition, in the present invention, by expanding functions of the PPS and CP GW in the data network, data services can be charged according to flow and content respectively. Then, combined with the charging rules predefined by the network operators, flexible charging can be implemented in various application cases of the subscribers, which means more flexible applications of the present invention.

When a subscriber requests for data service, in accordance with the present invention, firstly the SCP distributes a certain amount of fees from the subscriber's account and then the subscriber can utilize data services within the distributed fee limitation. When the fees corresponding to the subscriber's used data service are close to the distributed fee limitation, the SCP will be requested to distribute a certain amount of fees again, and the procedures will be repeated like this. If the SCP detects that balances of the subscriber's account is inadequate when requested to distribute a certain amount of fees, the subscriber will be stopped from utilizing data service. Obviously, if there is inadequate balance in the subscriber's account for the first fee distribution, the subscriber will be prohibited from utilizing data service directly. Therefore, complete real-time deduction is implemented in the present invention, accordingly ensuring benefits of the data service providers successfully and providing more sufficient guarantee for development of data services. Meanwhile, if the subscriber actively terminates data service utilization, the unused part of distributed fees will be returned to the subscriber's account in accordance with the present invention, thus effectively avoiding loss of the subscriber's benefits.

DETAILED DESCRIPTION OF THE INVENTION

The present invention will be described in detail hereinafter with reference to specific embodiments and the accompanying drawings.

In order to transmit the information about a prepaid voice account to a data service network, a connection device, namely DACP, is provided between a SCP of a voice transmission network and a PPS/CP GW of a data transmission network, and TCP/IP protocol is adopted for communications between the DACP and the SCP and between the DACP and the PPS/CP GW.

Figure 1:
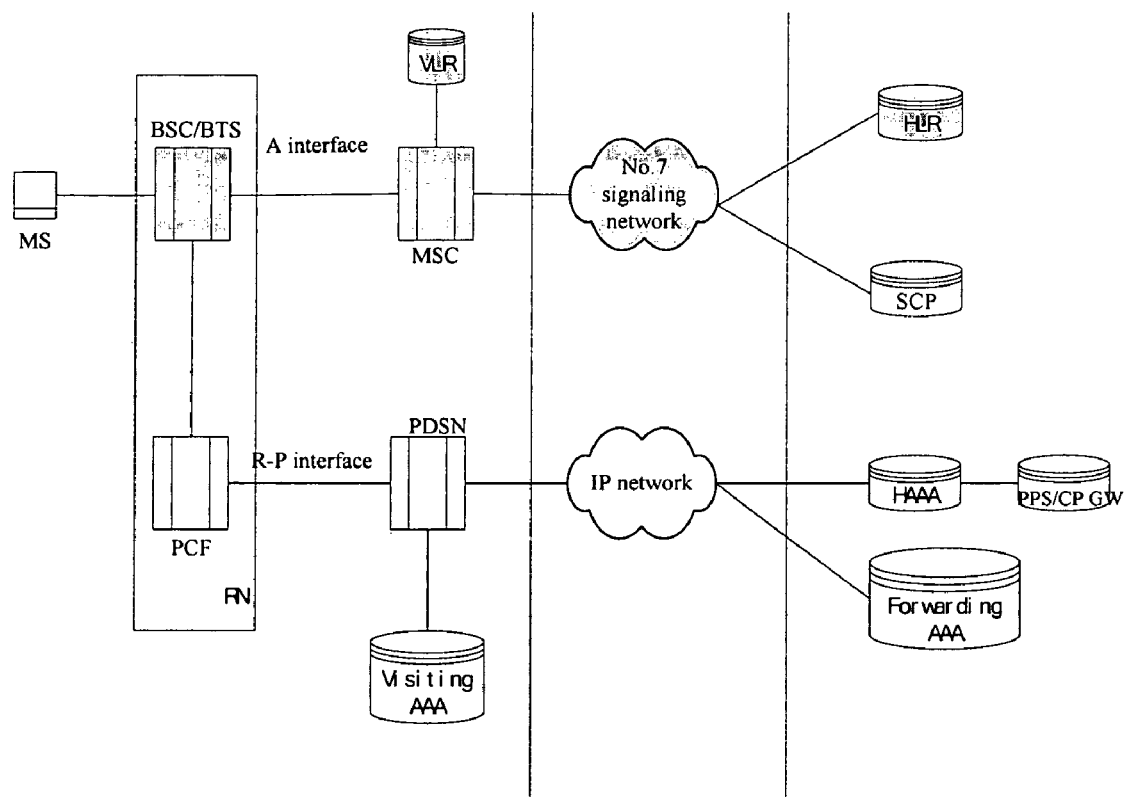
FIG. 1 is a schematic diagram illustrating the basic structure of a conventional CDMA network.
Figure 2:
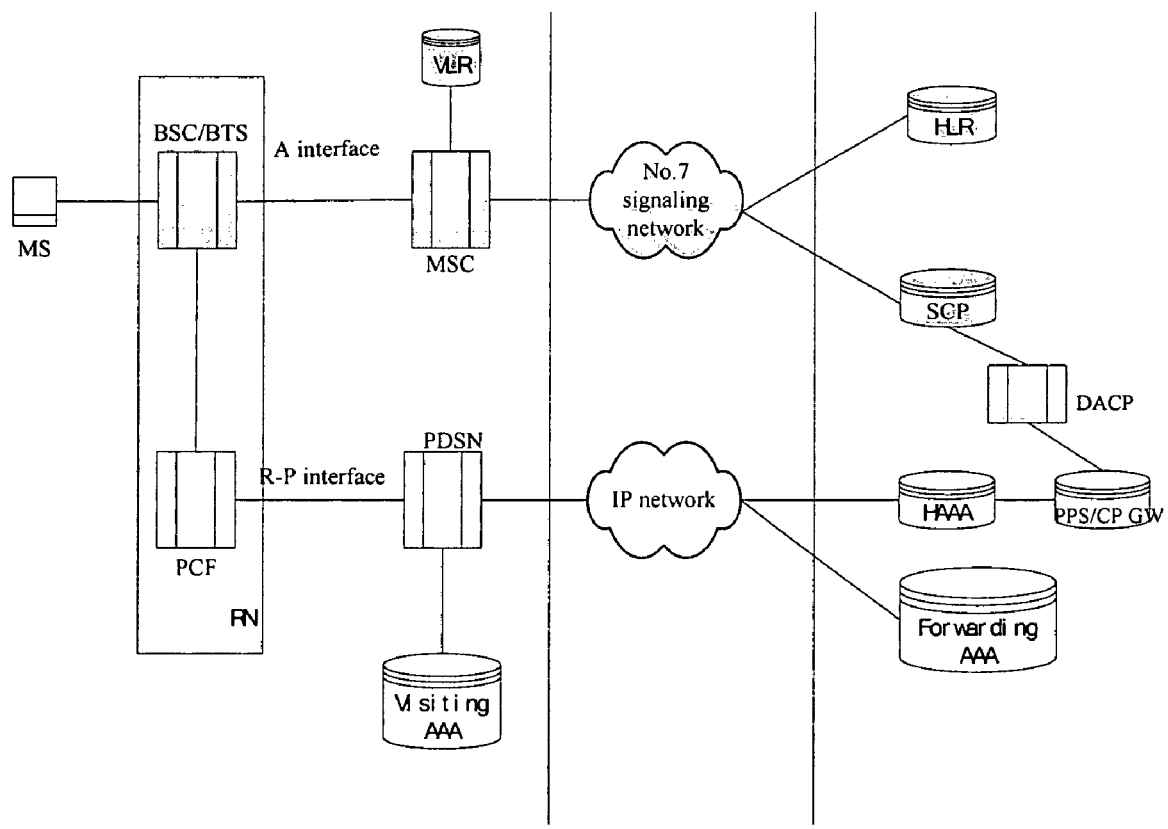
FIG. 2 is a schematic diagram illustrating the structure of a CDMA network system according to the present invention.

FIG. 2 shows the structure of a CDMA network system including a DACP. As shown in FIG. 2, a connection device, DACP, is added between the SCP and the PPS/CP GW. The DACP is a function entity used for fee calculation as well as for price confirmation, fee application and the like. Here, price confirmation means calculating the required fee of the current data service based on a predefined charging rate.

Figure 3:
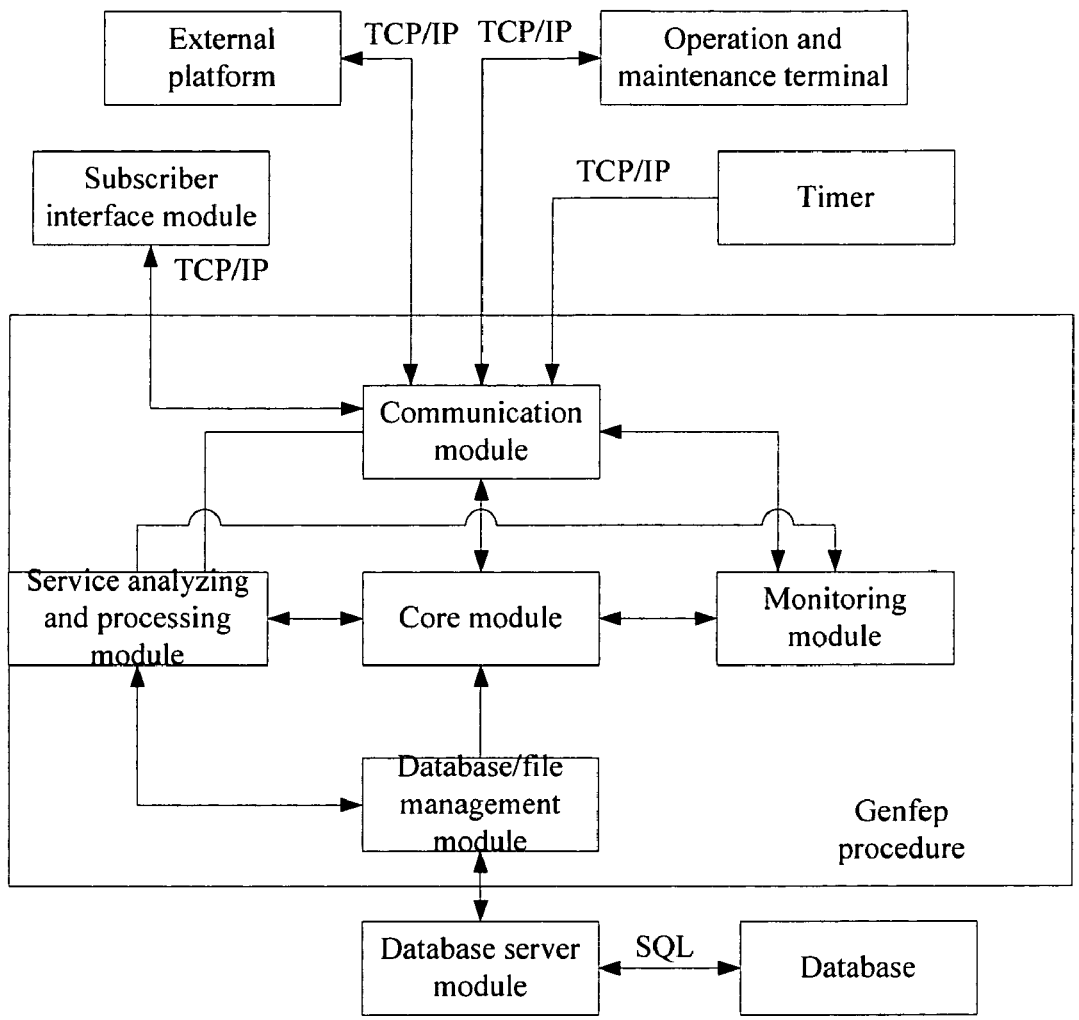
FIG. 3 is a schematic diagram illustrating the internal structure of a DACP.

FIG. 3 is a schematic diagram illustrating the internal structure of the DACP of the present invention. As shown in FIG. 3, the DACP of the present invention comprises eight modules: a communication module, a core module, a service analyzing and processing module, a monitoring module, a database/file management module, a subscriber interface module, a database server module and a timing module. The communication module is used for implementing communications between the DACP and an external platform as well as between the DACP and an operation and maintenance terminal through TCP/IP protocol, that is, TCP/IP protocol is adopted for both communications between the DACP and a SCP as well as those between the DACP and a PPS/CP GW. The core module is a central module used for coordinating operations among other modules so as to exchange external information, and used for completely controlling the flows of transaction processing. As a key part for implementing the present invention, the service analyzing and processing module is used for calculating fees according to configuration information of the database server module, and used for calculating the time period/flow quantity which is payable by the current fees. The monitoring module is used for providing functions such as flow quantity monitoring, protocol track and task query. The database/file management module is used for maintaining database operation and file operation of the DACP system, and for configuring relevant charging rates, such as the information about the subscriber's flow quantity and fee. The subscriber interface module is used for facilitating the subscriber in her/his configuration and maintenance of DACP. The database server module is responsible for realizing direct access to database, such as accepting operation instructions from the database/file management module and returning a database operation result after accessing the database according to the operation instructions. The timing module is used for sending timing messages to the DACP and triggering the DACP to execute corresponding functions.

In the DACP according to the present invention, the core module can implement bidirectional communications with any of the communication module, the service analyzing and processing module and the monitoring module, and can receive information from the database/file management module. The communication module can implement bidirectional communications with either of the service analyzing and processing module and the subscriber interface module, meanwhile it can receive information from the timing module and transmit information to the monitoring module. The database/file management module can implement bidirectional communications with either of the service analyzing and processing module and the database server module. TCP/IP protocol is adopted for communications between the communication module and the subscriber interface module, while message queue is adopted for communications between the database/file management module and the database server module.

It can be seen that, in the above-mentioned DACP, the communication module implements the fee application function of the present invention through communications with an external platform such as a SCP, while the service analyzing and processing module, the database/file management module and the database server module cooperate to implement the price confirmation function of the present invention, namely, the function of calculating fees according to relevant charging rates.

Figure 4:
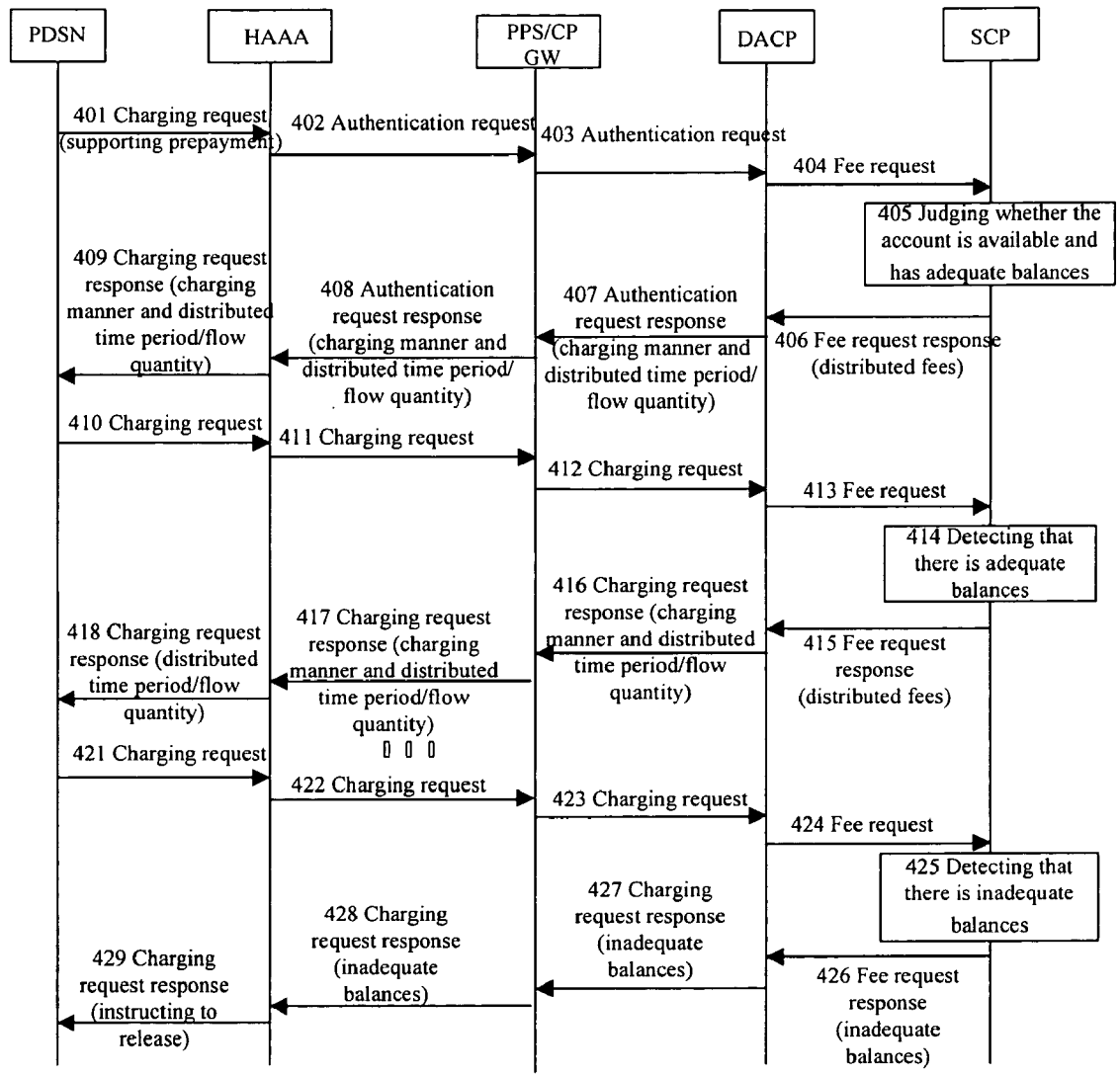
FIG. 4 is a flowchart illustrating the method according to the present invention under the condition that the data service for a subscriber is terminated due to inadequate amount in the account.
Figure 5:
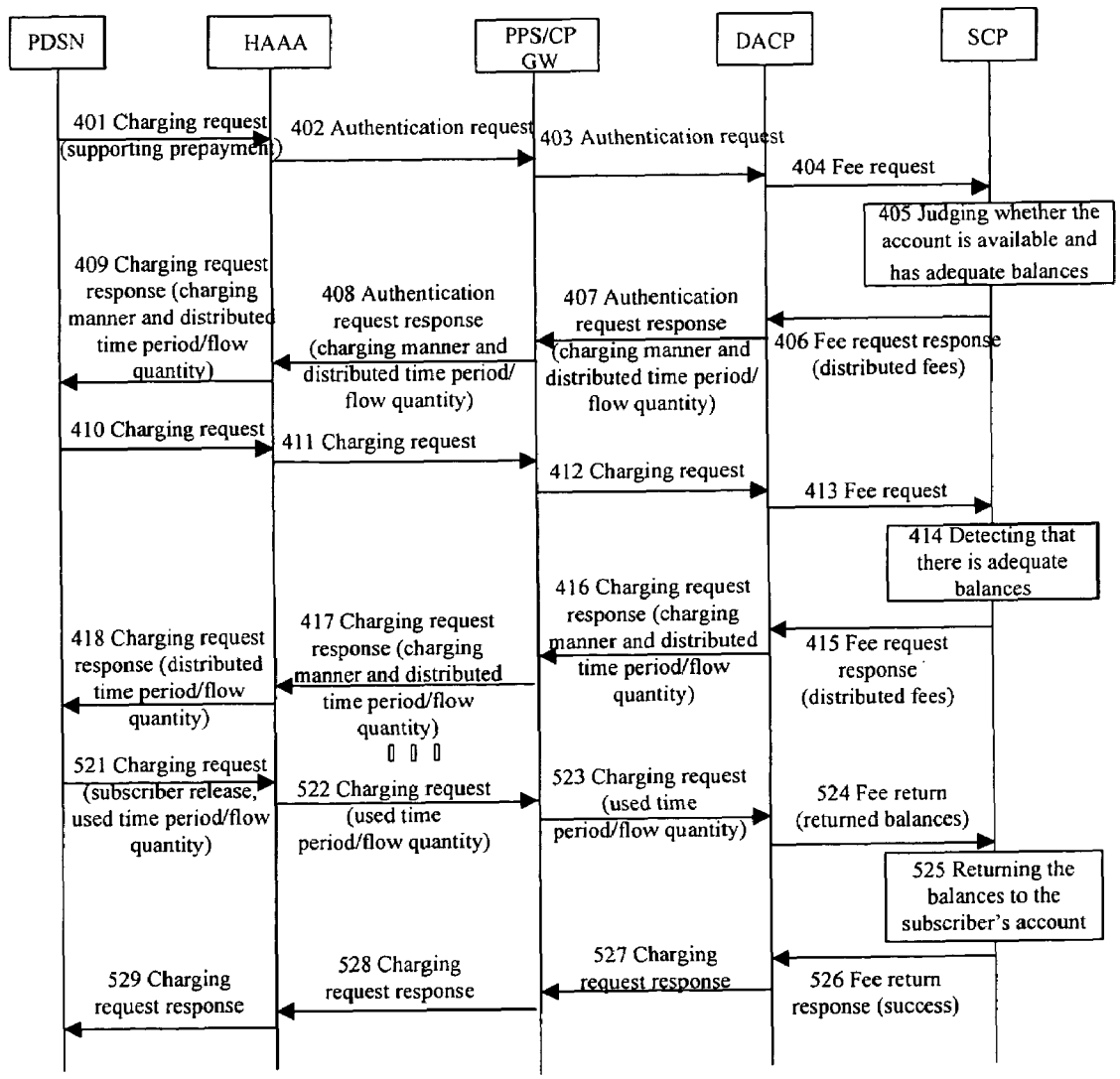
FIG. 5 is a flowchart illustrating the method according to the present invention under the condition that the subscriber actively terminates the data service.

FIG. 4 and FIG. 5 are flowcharts of the method according to the present invention under two conditions. Specifically speaking, FIG. 4 is a flowchart illustrating the method according to the present invention under the condition that the data service for a subscriber is terminated due to inadequate balance in the account while FIG. 5 is a flowchart illustrating the method according to the present invention under the condition that the subscriber actively terminates a data service. The processing steps which are identical in both FIGS. 4 and 5 are assigned the same reference signs. Procedures of the present invention will be described in detail hereinafter.

In step 401, a PDSN sends a charging request to a HAAA after a prepaid service subscriber requests a data service, which indicates that the PDSN supports prepaid function, namely, the PDSN can control the subscriber's use of the data service. In step 402, the HAAA sends an authentication request to a PPS/CP GW after confirming this subscriber as a prepaid subscriber according to the subscriber's mobile phone number segment.

In step 403, the PPS/CP GW forwards this authentication request to a DACP after receiving it from the HAAA.

In step 404, after receiving the authentication request, the DACP determines according to the authentication result that this subscriber is allowed for prepaid services and for data services, and then sends a fee request message to a SCP to request for fees of the current data service.

Note when a prepaid subscriber requests for a data service, the PDSN has obtained the type of the data service requested by the subscriber, and can distribute a certain amount of fees flexibly according to a predetermined charging manner, namely charging the subscriber either based on the time period or on the flow quantity. For instance, an amount of fees equivalent to a five-minute time period or that equivalent to 1000 bytes can be allocated in advance. Moreover, specific time period or byte quantity is determined by the DACP through a predefined rule and can be flexibly modified.

In step 405, the SCP makes a judgment on the account information, that is, judges whether the subscriber's account is available and has adequate distributable fees. If the subscriber's account is available and has adequate distributable fees, corresponding fees for use of the service will be deducted from the account before executing step 406 and subsequent steps. If the subscriber's account is unavailable or has inadequate distributable fees, a response message indicating unsuccessful fee distribution will be directly returned to the PDSN via the DACP, the PPS/CP GW and the HAAA. The PDSN then refuses to provide the data service for this subscriber, and the current procedure is ended.

In step 406, the SCP sends the DACP a fee request response containing distributed fee information. In step 407, after receiving the fee request response from the SCP, the DACP converts the applied fee information, namely distributed fees, into available time period or flow quantity according to the charging manner. Meanwhile, the DACP sends the PPS/CP GW an authentication request response message containing the charging manner information and the distributed time period/flow quantity information.

In steps 408 and 409, the PPS/CP GW returns a charging request response message containing the charging manner information and distributed time period/flow quantity to the PDSN via the HAAA, instructing the PDSN to control the subscriber's utilization of the data service according to corresponding time period/flow quantity.

When the subscriber's data service utilization is close to the current distributed fees, in step 410, the PDSN will send a new charging request message to the HAAA, and in steps 411 and 412, the HAAA will send a new charging request message to the DACP via the PPS/CP GW after receiving the charging request message from the PDSN, also in step 413, the DACP will send a charging request message to the SCP after receiving the charging request message from the PPS/CP GW.

In step 414, the SCP judges whether the account has adequate distributable amount of fees for this new charging request. Here, it is assumed that the account still has adequate distributable amount of fees, applied fees corresponding to this request will be deducted from the account before executing step 415 and the subsequent steps.

Steps 415 to step 418 are basically the same as steps 406 to step 409, except that the DACP returns an authentication request response message to the HAAA via the PPS/CP GW in steps 407 and step 408, while the DACP returns a charging request response message to the HAAA via the PPS/CP GW in steps 416 and step 417. This is because an authentication for the subscriber is required before the first distribution of fees, while no authentication is needed once the subscriber's identity has been authenticated and confirmed, directly performing charging request and responding to the charging request. Note that both the authentication request response message in steps 407 and 408 and the charging request response message in steps 416 and 417 contain the charging manner and the distributed time period/flow quantity information.

After step 418 is executed, if the subscriber needs continuing to utilize data service, steps 410 to 418 can be repeated, assuming that the account has adequate distributable amount of fees each time the subscriber requests.

The processing when there is no adequate amount of fees in the account for the subscriber's request will be described below.

Similar to steps 410 to 413, in steps 421 to 424 as shown in FIG. 4, the PDSN requests the SCP for new data service fees via the HAAA, the PPS/CP GW and the DACP. When detecting that there is inadequate distributable fees in the subscriber's account in step 425, the SCP will directly send a fee request response message indicating inadequate balance to the DACP in step 426, instead of deducting relevant fees from the account. In steps 427 and 428, the DACP sends a charging request response message indicating inadequate balance to the HAAA via the PPS/CP GW. Then in step 429, the HAAA sends a charging request response message to the PDSN, instructing the PDSN to terminate the subscriber's use of the current data service. The PDSN will terminate the subscriber's use of the current data service after receiving the instruction, thus preventing the account overdraft due to utilization of data service in case of inadequate balance, and thereby guaranteeing the interests of data service providers.

In contrast to the above situation that the subscriber has to passively stop utilizing a data service due to inadequate balance, the subscriber may actively stop utilizing a data service when he does not need to utilize this data service any more after a certain period of time. In this case, referring to FIG. 5, after the subscriber stops utilizing the data service, in step 521, the PDSN will send the HAAA a charging request message containing the information indicating the subscriber's termination of the use of the data service and the consumed time period/flow quantity so far. In steps 522 and 523, the HAAA forwards this message to the DACP via the PPS/CP GW. In step 524, the DACP converts distributed but unused time period/flow quantity into fees, and then sends a fee return request message to the SCP, instructing the SCP to return corresponding fees.

In step 525, after receiving the fee return request message, the SCP will return the distributed but unused fees to the subscriber's account, and then send a message indicating successful fee return to the DACP in step 526. In steps 527 to 529, the DACP sends this message indicating successful fee return to the PDSN via the PPS/CP GW and the HAAA. Thus, the subscriber's unused fees distributed by the SCP are returned to the subscriber's account, so that the subscriber will not suffer any loss and her/his interests are further guaranteed.

All messages of the present invention at least contain a message identifier, a mobile terminal number, an IP address and a label of the PPS/CP GW server as well as other parameters. Besides, the authentication request message and the fee request message also contain parameters denoting applied fees and remained fees, the fee return message also contains parameter denoting returned fees, while the authentication request response message and the fee request response message also contain a parameter denoting applied fees. In addition, the authentication request response message may also contain an authentication response parameter which is denotative for one of the following situations: authentication being passed, user data not existing, stored value card being invalid, balance being no more than zero, the user being locked, and system error etc.

In the present invention, the PPS and the CP GW can be configured either in the same physical entity or different ones. In addition, the PPS/CP GW and the HAAA can also be configured in the same physical entity. Execution and effect of the present invention will not be affected no matter how these functional entities are configured.

The system and method of this invention has been described hereinbefore. The present invention is applicable to a CDMA 1X packet network and a CDMA 2000 packet network. Moreover, the idea of the present invention is also applicable to other CDMA networks and even other wireless communication networks. Therefore, it is appreciated that the foregoing description is a demonstration of the present invention, rather than limitation to the present invention.

The invention claimed is:

1. A system for implementing prepaid data service in a mobile communication network, comprising a Radio Network (RN), a Packet Data Service Node (PDSN), a Home Authentication Authorization and Accounting (HAAA) server, a Prepaid Server (PPS)/Content Provider Gateway (CP GW), a Mobile Switching Center (MSC) and a Service Control Point (SCP), the RN being communicatively connected to both the MSC and the PDSN, the MSC being communicatively connected to the SCP, the PDSN being communicatively connected to the HAAA and the HAAA being communicatively connected to the PPS/CP GW, further comprising:
- a Data service Access Control Point (DACP), communicatively connected to both the PPS/CP GW and the SCP, configured to:
- send a fee request message to the SCP after receiving a charging request message to request fee distribution from the HAAA via the PPS/CP GW,
- convert, after receiving a fee request response message from the SCP containing information about distributed fee, the information about the distributed fee into information for the PDSN to control data service utilization of the subscriber, and
- send a charging request response message containing the information for the PDSN to control the data service utilization of the subscriber to the PDSN via the PPS/CP GW and the HAAA.

2. The system according to claim 1, wherein the DACP comprises a communication module used for communicating with the SCP to implement fee application function;
- a service analyzing and processing module, a database/file management module and a database server module, connected in series and used for implementing price confirmation function for the data service; and
- a core module, respectively connected with the communication module, the service analyzing and processing module and the database/file management module, used for controlling the communication module, the service analyzing and processing module and the database/file management module and the database server module to cooperate with one another.

3. The system according to claim 2, wherein the DACP further comprises:
- a monitoring module, connected with the communication module, used for monitoring operations of the communication module, the core module and the service analyzing and processing module;
- a timing module used for sending timing messages; and
- a user interface module, connected with the communication module, for providing the DACP with an interface for system coordination and maintenance.

4. The system according to claim 1, wherein Transmission Control Protocol/Internet Protocol (TCP/IP) is adopted for communications between the DACP and the SCP as well as communications between the DACP and the PPS/CP GW.

5. A method for implementing prepaid data service in a mobile communication network, wherein the mobile communication network comprises a Service Control Point (SCP) storing account information of subscribers, a Packet Data Service Node (PDSN), a Home Authentication Authorization and Accounting (HAAA), and a Prepaid Server (PPS)/Content Provider Gateway (CP GW) and a Data service Access Control Point (DACP), the DACP being configured between the PPS/CP GW and the SCP, and adapted for implementing price confirmation function and fee application function for the data service the method comprising: after receiving a charging request message requesting fee distribution from the HAAA via the PPS/CP GW, sending, by the DACP, a fee request message to the SCP; and
- after receiving a fee request response message containing information about distributed fee from the SCP, converting, by the DACP, the information about the distributed fee into information for the PDSN to control data service utilization of the subscriber, and sending a charging request response message containing the information for the PDSN to control the data service utilization of the subscriber to the PDSN via the PPS/CP GW and the HAAA.

6. The method according to claim 5, wherein after the DACP sends the fee request message to the SCP, the method further comprising:
- judging, by the SCP, whether the requested fee can be withdrawn from a prepaid account of the subscriber, if the requested fee cannot be withdrawn from the prepaid account, returning, by the SCP, a response message indicating failure in fee distribution to the DACP, returning, by the DACP, a response message indicating failure in fee distribution to the PDSN via the PPS/CP GW and the HAAA, the PDSN refusing the data service utilization of the subscriber or terminating the data service currently used by the subscriber, and then ending the current procedure.

7. The method according to claim 5, wherein the information for the PDSN to control the data service utilization of the subscriber is time period information or flow quantity information, the charging request message received by the DACP from the HAAA via the PPS/CP GW further comprises charging manner information which indicates either time period or flow quantity will be used to control the subscriber to utilize data service, the DACP converts the distributed fee into time period information or flow quantity information according to the charging manner information, and the charging request response message further comprises the charging manner information.

8. The method according to claim 7, further comprising:
- after receiving information indicating the subscriber has terminated data service utilization, sending, by the PDSN, charging request information containing information indicating the subscriber's termination and used time period/flow quantity information to the HAAA, sending, by the HAAA, a charging request message containing the used time period/flow quantity information to the DACP via the PPS/CP GW, converting, by the DACP, unused time period/flow quantity into fee information and sending a fee return message containing the fee information to the SCP; and
- returning, by the SCP, the fee information to the prepaid account of the subscriber, sending a fee return response message indicating successful fee return to the DACP, and returning, by the DACP, a charging request response message indicating successful fee return to the PDSN via the PPS/CP GW and the HAAA.

9. The method according to claim 5, wherein when the required fee of the data service utilization by the subscriber are close to the distributed fee, sending, by the PDSN, a charging request message to the HAAA again so as to request fee for the next data service utilization.

10. The method according to claim 5, wherein each of the charging request message, the charging request response message, the fee request message and the fee request response message comprises at least an information identifier, a mobile terminal number, an IP address of the PPS/CP GW server and a serial number of the PPS/CP GW server.

* * * * *

UNITED STATES PATENT AND TRADEMARK OFFICE
CERTIFICATE OF CORRECTION

| | | |
|---|---|---|
| PATENT NO. | : 7,769,151 B2 | Page 1 of 1 |
| APPLICATION NO. | : 10/562867 | |
| DATED | : August 3, 2010 | |
| INVENTOR(S) | : Jie Zhang et al. | |

It is certified that error appears in the above-identified patent and that said Letters Patent is hereby corrected as shown below:

Claim 5, column 9, line 52, after "(HAAA)," delete -- and --.

Signed and Sealed this
Twenty-second Day of February, 2011

David J. Kappos
*Director of the United States Patent and Trademark Office*